United States Patent
Wu et al.

(10) Patent No.: US 12,347,038 B2
(45) Date of Patent: Jul. 1, 2025

(54) CRACK DETECTION, ASSESSMENT AND VISUALIZATION USING DEEP LEARNING WITH 3D MESH MODEL

(71) Applicant: Bentley Systems, Incorporated, Exton, PA (US)

(72) Inventors: Zheng Yi Wu, Watertown, CT (US); Rony Kalfarisi, North Sumatera (ID); Ken Soh, Singapore (SG)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 17/027,829

(22) Filed: Sep. 22, 2020

(65) Prior Publication Data

US 2022/0092856 A1    Mar. 24, 2022

(51) Int. Cl.
*G06T 19/00* (2011.01)
*G01C 11/02* (2006.01)
(Continued)

(52) U.S. Cl.
CPC ............ *G06T 19/006* (2013.01); *G01C 11/02* (2013.01); *G01C 11/04* (2013.01);
(Continued)

(58) Field of Classification Search
CPC ....... G06T 19/006; G01C 11/02; G01C 11/04; G06K 9/00671; G06K 9/2054; G06K 9/4604; G06K 9/6257
(Continued)

(56) References Cited

U.S. PATENT DOCUMENTS

| 9,196,048 B2 | 11/2015 | Jahanshahi et al. |
| 9,964,468 B1 | 5/2018 | Wu et al. |

(Continued)

OTHER PUBLICATIONS

Abdel-Qader, Ikhals, et al., "Analysis of Edge-Detection Techniques for Crack Identification in Bridges," American Society of Civil Engineers, ASCE, Journal of Computing in Civil Engineering, vol. 17, Issue 4, Oct. 1, 2003, pp. 255-263.
(Continued)

*Primary Examiner* — Hai Tao Sun
(74) *Attorney, Agent, or Firm* — Cesari and McKenna, LLP; James A. Blanchette

(57) ABSTRACT

In various example embodiments, techniques are provided for crack detection, assessment and visualization that utilize deep learning in combination with a 3D mesh model. Deep learning is applied to a set of 2D images of infrastructure to identify and segment surface cracks. For example, a Faster region-based convolutional neural network (Faster-RCNN) may identify surface cracks and a structured random forest edge detection (SFRED) technique may segment the identified surface cracks. Alternatively, a Mask region-based convolutional neural network (Mask-RCNN) may identify and segment surface cracks in parallel. Photogrammetry is used to generate a textured three-dimensional (3D) mesh model of the infrastructure from the 2D images. A texture cover of the 3D mesh model is analyzed to determine quantitative measures of identified surface cracks. The 3D mesh model is displayed to provide a visualization of identified surface cracks and facilitate inspection of the infrastructure.

9 Claims, 11 Drawing Sheets

(51) Int. Cl.
G01C 11/04 (2006.01)
G06F 18/214 (2023.01)
G06V 10/22 (2022.01)
G06V 10/44 (2022.01)
G06V 20/20 (2022.01)

(52) U.S. Cl.
CPC .......... *G06F 18/2148* (2023.01); *G06V 10/22* (2022.01); *G06V 10/44* (2022.01); *G06V 20/20* (2022.01); *G06T 2219/004* (2013.01)

(58) Field of Classification Search
USPC ........................................................ 345/419
See application file for complete search history.

(56) References Cited

U.S. PATENT DOCUMENTS

| | | | |
|---|---|---|---|
| 9,983,776 | B1 | 5/2018 | Wu et al. |
| 10,295,435 | B1 | 5/2019 | Wu et al. |
| 10,650,588 | B2 | 5/2020 | Hazeghi et al. |
| 2013/0034305 | A1 | 2/2013 | Jahanshahi et al. |
| 2018/0336683 | A1* | 11/2018 | Feng ........................ G06N 3/08 |
| 2020/0166907 | A1* | 5/2020 | Frederick .............. B29C 64/386 |
| 2020/0284686 | A1* | 9/2020 | Li ....................... G01M 5/0033 |
| 2020/0342209 | A1* | 10/2020 | Li ........................ G06N 3/0454 |
| 2021/0082102 | A1* | 3/2021 | Denigan, III ............ G01C 9/00 |

OTHER PUBLICATIONS

Abdel-Qader, Ikhals, et al., "PCA-Based Algorithm for Unsupervised Bridge Crack Detection," Elsevier Ltd, Elsevier, Science Direct, Advances in Engineering Software, vol. 37, Issue 12, Dec. 2006, pp. 771-778.
Abe, Satoshi, et al., "A High-Speed Image Processor for Detection of Pavement Cracks," In Proceedings of the International Association for Pattern Recognition, IAPR, Workshop on Machine Vision Applications, MVA'92, Tokyo, Japan, Dec. 7-9, 1992, pp. 529-532.
Adhikari, R. S., et al., "Image-Based Retrieval of Concrete Crack Properties," The International Association for Automation and Robotics in Construction, I.A.A.R.C., 2012 Proceedings of the 29th ISARC International Symposium on Automation and Robotics in Construction, Eindhoven, Netherlands, Jun. 2012, pp. 1-7.
Alaknanda, A., et al., "Flaw Detection in Radiographic Weld Images Using Morphological Approach," Elsevier Ltd, Elsevier, Science Direct, NDT& E International, vol. 39, Jul. 26, 2005, pp. 29-33.
Amano, Isao, et al., "Faster, Safer, Smarter: Automatic Crack Detection Methods on Larger Scale Concrete Infrastructure," The American Society for Nondestructive Testing, Inc., From 2016 Digital Imaging-Improving Inspection in Evolving Industries Paper Summaries, Jul. 25-26, 2016, pp. 12-16.
Amhaz, Rabih, et al., "Automatic Crack Detection on 2D Pavement Images: An Algorithm Based on Minimal Path Selection," IEEE, IEEE Transactions on Intelligent Transportation Systems, vol. 17, Issue 10, Sep. 20, 2016, pp. 1-12.
Behzadan, Amir H., et al., "Augmented Reality Visualization: A Review of Civil Infrastructure System Applications," Elsevier Ltd, Elsevier, Science Direct, Advanced Engineering Informatics, vol. 29, Apr. 7, 2015, pp. 252-267.
Bu, G.P., et al., "Crack Detection Using a Texture Analysis-based Technique for Visual Bridge Inspection," eJSE International, Special Issue: Electronic Journal of Structural Engineering, vol. 14, Issue 1, Jan. 2015, pp. 41-48.
Cha, Young-Jin, et al., "Deep Learning-Based Crack Damage Detection Using Convolutional Neural Networks," Computer- Aided Civil and Infrastructure Engineering, vol. 00, Mar. 23, 2017, pp. 1-18.
Chen, Fu-Chen, et al., "A Texture-Based Video Processing Methodology Using Bayesian Data Fusion for Autonomous Crack Detection on Metallic Surfaces," Computer-Aided Civil and Infrastructure Engineering, vol. 0, Feb. 13, 2017, pp. 1-17.
Chen, Fu-Chen, et al., "NB-CNN: Deep Learning-based Crack Detection Using Convolutional Neural Network and Naïve Bayes Data Fusion," IEEE, IEEE Transactions on Industrial Electronics, Oct. 19, 2017, pp. 1-10.
Chen, Liang-Chien, et al., "Measuring System for Cracks in Concrete Using Multitemporal Images," ASCE, American Society of Civil Engineers, Journal of Surveying Engineering, vol. 132, Issue 2, May 2006, pp. 77-82.
Cho, Yong K., et al., "3D As-Is Building Energy Modeling and Diagnostics: A Review of State-Of-The-Art," Elsevier Ltd, Elsevier, Science Direct, Advanced Engineering Informatics, vol. 29, Apr. 11, 2015, pp. 184-195.
"ContextCapture: Software to Automatically Generate Detailed 3D Models from Photographs," Quick Start Guide, Reality Modeling, CONNECT Edition, Bentley, Mar. 15, 2017, pp. 1-34.
Davoudi, Rouzbeh, et al., "Structural Load Estimation Using Machine Vision and Surface Crack Patterns for Shear-Critical RC Beams and Slabs," American Society of Civil Engineers, ASCE, Journal of Computing in Civil Engineering, vol. 32, Issue 4, Jul. 2018, pp. 1-14.
Dollár, Piotr, et al., "Structured Forests for Fast Edge Detection," IEEE, 2013 IEEE International Conference on Computer Vision, Sydney, NSW, Australia, Dec. 1-8, 2013, pp. 1-8.
Dorafshan, "Automatic Surface Crack Detection in Concrete Structures Using OTSU Thresholding and Morphological Operations," Utah State University, CEE Faculty Publications, Civil and Environmental Engineering, Paper 1234, Apr. 2016, pp. 1-153.
Fan, Zhun, et al., "Automatic Pavement Crack Detection Based on Structured Prediction with the Convolutional Neural Network," arXiv, Cs.CV, Feb. 1, 2018, pp. 1-9.
Fathi, Habib, et al., "Automated As-built 3D Reconstruction of Civil Infrastructure Using Computer Vision: Achievements, Opportunities, and Challenges," Elsevier Ltd, Elsevier, Science Direct, Advanced Engineering Informatics, vol. 29, Feb. 24, 2015, pp. 149-161.
Fukushima, Kunihiko, "Neocognitron: A Self-organizing Neural Network Model for a Mechanism of Pattern Recognition Unaffected by Shift in Position," Springer-Verlag, Biological Cybernetics, vol. 36, Apr. 1980, pp. 193-202.
German, Stephanie, et al., "Machine Vision-Enhanced Postearthquake Inspection," ASCE, American Society of Civil Engineers, Journal of Computing in Civil Engineering, vol. 27, Issue 6, Nov./Dec. 2013, pp. 622-634.
Gulgec, Nur Sila, et al., "Convolutional Neural Network Approach for Robust Structural Damage Detection and Localization," American Society of Civil Engineers, ASCE, Journal of Computing in Civil Engineering, vol. 33, Issue 3, May 2019, pp. 1-11.
He, Kaiming, et al., "Deep Residual Learning from Image Recognition," CVF (Computer Vision Foundation), CVPR, IEEE, 2016 IEEE Conference on Computer Vision and Pattern Recognition (CVRP), Las Vegas, NV, USA, Jun. 27-30, 2016, pp. 770-778.
Hengmeechai, Jantira, "Automated Analysis of Sewer Inspection Closed Circuit Television Videos Using Image Processing Techniques," Thesis, Faculty of Graduate Studies and Research, University of Regina, Regina, Saskatchewan, May 2013, pp. 1-151.
Jahanshahi, Mohammad R., et al., "Adaptive Vision-based Crack Detection Using 3D Scene Reconstruction for Condition Assessment of Structures," Elsevier B.V., Elsevier, SciVerse Science Direct, Automation in Construction, vol. 22, Jan. 2, 2012, pp. 567-576.
Jahanshahi, Mohammad R., et al., "A New Methodology for Non-Contact Accurate Crack Width Measurement Through Photogrammetry for Automated Structural Safety Evaluation," IOP Publishing, Smart Materials and Structures, vol. 22, Feb. 15, 2013, pp. 1-12.
Kim, Byunghyun, et al., "Automated Vision-Based Detection of Cracks on Concrete Surfaces Using a Deep Learning Technique," MDPI, Sensors, vol. 18, Oct. 14, 2018, pp. 1-18.
Koch, Christian, et al., "A Review on Computer Vision Based Defect Detection and Condition Assessment of Concrete and Asphalt Civil Infrastructure," Elsevier Ltd, Elsevier, Science Direct, Advanced Engineering Informatics, vol. 29, Feb. 21, 2015, pp. 196-210.
"Kuraves-Actis: Auto Crack Tracing Image System," Nexco West, Nexco West USA Inc., May 2018, pp. 1-2.

(56) References Cited

OTHER PUBLICATIONS

Mohan, Arun, et al., "Crack Detection Using Image Processing: A Critical Review and Analysis," Elsevier B.V., Faculty of Engineering, Alexandria University, Alexandria Engineering Journal, Jan. 2017, pp. 1-12.
Moon, Hyeong-Gyeong, et al., "Intelligent Crack Detecting Algorithm on the Concrete Crack Image Using Neural Network," In Proceedings of the 28th International Symposium on Automation and Robotics in Construction, ISARC 2011, Seoul, Republic of Korea, Jun. 29-Jul. 2, 2011, pp. 1461-1467.
Neogi, Nirbhar, et al., "Review of Vision-Based Steel Surface Inspection Systems," Springer, EURASIP Journal on Image and Video Processing, vol. 50, Nov. 13, 2014, pp. 1-19.
Park, Somin, et al., "Patch-Based Crack Detection in Black Box Images Using Convolutional Neural Networks," American Society of Civil Engineers, ASCE, Journal of Computing in Civil Engineering, vol. 33, Issue 3, May 2019, pp. 1-11.
Pǎatrǎucean, Viorica, et al., "State of Research in Automatic As-built Modelling," Elsevier Ltd, Elsevier, Science Direct, Advanced Engineering Informatics, vol. 29, Feb. 3, 2015, pp. 162-171.
Pereira, Fábio Celestino, et al., "Embedded Image Processing Systems for Automatic Recognition of Cracks Using UAVs," Elsevier Ltd, IFAC (International Federation of Automatic Control), Elsevier, ScienceDirect, IFAC Papers Online, vol. 48, Issue 10, Dec. 2015, pp. 16-21.
Rabah, Mostafa, et al., "Automatic Concrete Cracks Detection and Mapping of Terrestrial Laser Scan Data," Elsevier B.V., National Research Institute of Astronomy and Geophysics, NRIAG Journal of Astronomy and Geophysics, vol. 2, Dec. 31, 2013, pp. 250-255.
Sarshar, Nima, et al., "Video Processing Techniques for Assisted CCTV Inspection and Condition Rating of Sewers," CHI Journal, Journal of Water Management Modeling, R2350-08, Jan. 2009, pp. 129-147.
Seo, JoonOh, et al., "Computer Vision Techniques for Construction Safety and Health," Elsevier Ltd, Elsevier, Science Direct, Advanced Engineering Informatics, vol. 29, Feb. 21, 2015, pp. 239-251.
Sinha, Sunil K., et al., "Automated Detection of Cracks in Buried Concrete Pipe Images," Elsevier B.V., Elsevier, Automation in Construction, vol. 15, Issue 1, Jan. 2006, pp. 58-72.
Sollazzo, G., et al., "Hybrid Procedure for Automated Detection of Cracking with 3D Pavement Data," American Society of Civil Engineers, ASCE, Journal of Computing in Civil Engineering, vol. 30, Issue 6, Nov. 2016, pp. 1-12.
Son, Hyojoo, et al., "As-built Data Acquisition and its Use in Production Monitoring and Automated Layout of Civil Infrastructure: A Survey," Elsevier Ltd, Elsevier, Science Direct, Advanced Engineering Informatics, vol. 29, Feb. 7, 2015, pp. 172-183.
Teizer, Jochen, "Status Quo and Open Challenges in Vision-Based and Tracking Resources on Infrastructure Construction Sites," Elsevier Ltd, Elsevier, Science Direct, Advanced Engineering Informatics, Apr. 20, 2015, pp. 225-238.
Torok, Matthew, et al., "Image-Based Automated 3D Crack Detection for Post-disaster Building Assessment," American Society of Civil Engineers, ASCE, Journal of Computing in Civil Engineering, vol. 28, Issue 5, Sep. 2014, pp. 1-13.
U.S. Appl. No. 16/796,462, filed Feb. 20, 2020 by Zheng Yi Wu, et al. for Evolutionary Deep Learning With Extended Kalman Filter for Modeling and Data Assimilation, 1-40.
U.S. Appl. No. 16/931,785, filed Jul. 17, 2020 by Zheng Yi Wu, et al. for Finite Element Calibration for Structural Load Identification, 1-28.
Wang, Ruisheng, "3D Building Modeling Using Images and LiDAR: A Review," Taylor & Francis Group, International Journal of Image and Data Fusion, vol. 4, No. 4, Jul. 5, 2013, pp. 273-292.
Wu, Liuliu, et al., "Improvement of Crack-Detection Accuracy Using a Novel Crack Defragmentation Technique in Image-Based Road Assessment," American Society of Civil Engineers, ASCE, Journal of Computing in Civil Engineering, Nov. 14, 2014, pp. 1-19.
Yamaguchi, Tomoyuki, et al., "Image-Based Crack Detection for Real Concrete Surfaces," Paper, Wiley InterScience, Institute of Electrical Engineers of Japan, John Wiley & Sons, Inc., Transactions on Electrical and Electronic Engineering, IEEEJ Trans., vol. 3, Dec. 17, 2007, pp. 128-135.
Yang, Jun, et al., "Construction Performance Monitoring Via Still Images, Time-lapse Photos, and Video Streams: Now, Tomorrow, and the Future," Elsevier Ltd, Elsevier, Science Direct, Advanced Engineering Informatics, vol. 29, Feb. 20, 2015, pp. 211-224.
Yeum, C. M., et al., "Autonomous Image Localization for Visual Inspection of Civil Infrastructure," IOP Publishing Ltd., Smart Materials and Structures, vol. 26, Feb. 21, 2017, pp. 1-12.
Yeum, Chul Min, et al., "Vision-Based automated Crack Detection for Bridge Inspection," Computer-Aided Civil and Infrastructure Engineering, vol. 30, May 15, 2015, pp. 759-770.
Yokoyama, Suguru, et al., "Development of an Automatic Detector of Cracks in Concrete Using Machine Learning," Elsevier Ltd, The Authors, Elsevier, Science Direct, Procedia Engineering, vol. 171, Dec. 2017, pp. 1250-1255.
Zhang, Kaige, et al., "Unified Approach to Pavement Crack and Sealed Crack Detection Using Preclassification Based on Transfer Learning," American Society of Civil Engineers, ASCE, Journal of Computing in Civil Engineering, vol. 32, Issue 2, Mar. 2018, pp. 1-12.
Zhang, Lei, et al., "Road Crack Detection Using Deep Convolutional Neural Network," IEEE, 2016 IEEE International Conference on Image Processing (ICIP), Phoenix, AZ, USA, Sep. 25-28, 2016, pp. 1-5.

\* cited by examiner

CRACK DETECTION, ASSESSMENT AND VISUALIZATION USING DEEP LEARNING WITH 3D MESH MODEL

BACKGROUND

Technical Field

The present disclosure relates generally to infrastructure inspection, and more specifically to automatic crack detection, assessment and visualization.

Background Information

Infrastructure (e.g., bridges, buildings, dams, railways, highways, etc.) typically deteriorates over time. Such structures are often subject to fatigue stress, thermal expansion and contraction, eternal load, and other effect that can have negative impacts, including causing cracks. Cracks reduce local stiffness and cause material discontinuities, which if unaddressed can cause further damage and possibly total failure. While some cracks may be hidden below the surface, often cracks manifest and are visible upon the surface. This is especially true in infrastructure made of concrete, masonry or other similar materials. Early detection of such surface cracks, and repair of the related deterioration, is important for maximizing the service life of infrastructure.

Manual inspection is currently the standard practice for detecting surface cracks in infrastructure. In manual inspection, a human inspector visually scrutinizes the structure to locate surface cracks and then records their size and location, often by making annotated sketches. The accuracy of the results depend almost entirely on the human inspector's judgement and expertise. Further, different human inspectors may produce entirely different results for the same structure. This subjectivity and lack of repeatability hinders quantitative analysis and the implementation of more sophisticated maintenance and repair regimes.

There have been a number of research efforts to improve upon manual inspection for detecting surface cracks in infrastructure. Some of these efforts have attempted to apply computer vision techniques to surface crack detection. A number of images (e.g., 2D images such as photographs) are collected of the surfaces of the infrastructure. Computer vision techniques are then applied to these images to attempt to distinguish between cracks and background. Some attempts focused on image processing techniques (IPTs), including thresholding and edge-detection based methods. However, many IPT-based approaches struggled to detect non-continuous or high-curvature cracks. Further, many IPT-based approaches failed to separate cracks from background when the background is complicated (e.g., covered in dirt, shadows, vegetation or other noise-inducing factors), leading to false feature extraction.

Other efforts have incorporated learning-based techniques that can learn patterns (or features) from images to predict surface cracks. This can help alleviate the negative effects of background noise, among other benefits. Some have implemented a combination of machine learning algorithm (MLA)-based classification (e.g., support vector machine learning, random forest machine leaning, or other classical machine-leaning) with IPT-based feature extraction for surface crack detection. Yet even after incorporating MLAs, the results often still suffered from the false feature extraction. This is because the features extracted using IPTs still do not necessarily represent the true characteristics of surface cracks.

In recent years there have been some efforts to improve surface crack detection using convolutional neural network (CNN)-based techniques. Although CNNs showed strong potential, early techniques proved to be inefficient for precisely locating surface cracks. To address this issue, several techniques have been attempted to improve performance of basic CNNs, by using more accurate and efficient networks such as region based CNNs (RCNNs), Fast-RCNNs, and Faster-RCNNs. Such techniques have shown promise in improving surface crack detection. However, they still suffer a number of shortcomings, which has hindered their widespread deployment as a replacement for manual inspection.

One shortcoming is that they typically just identify bounding boxes around cracks and do not segment the cracks themselves. FIG. 1 is a 2D image 100 that may be produced by an existing CNN-based crack-detection technique. A number of bounding boxes 110 that surround cracks are identified. However, the exact bounds of the crack are not determined and the output is not segmented into crack pixels and non-crack pixels. A second closely related shortcoming is that they do not facilitate quantitative assessments of cracks. Because cracks are typically not segmented into crack pixels and non-crack pixels, quantitative measures such as crack area, width and length cannot readily be calculated or estimated. This may hinder evaluation and analysis of the state of the infrastructure. A third shortcoming is that they typically do not provide an easy to use visualization of detected cracks. A 2D image with bounding boxes 110 that surround cracks, such as that in FIG. 1, may be shown to the user. However, the user is typically left to perceive the cracks themselves within the bounding boxes 110. Further, the 2D image often represents only a small part of the structure. The user is left to themselves to discern what part of the structure the image covers, and how it may relate to other 2D images which may cover other, potentially overlapping, parts of the structure.

Accordingly, there is a need for improved techniques for automatic crack detection, assessment and visualization.

SUMMARY

In various example embodiments, techniques are provided for crack detection, assessment and visualization that utilize deep learning in combination with a 3D mesh model. Deep learning is applied to a set of 2D images of infrastructure to identify and segment surface cracks. For example, a Faster region-based convolutional neural network (Faster-RCNN) may identify surface cracks and a structured random forest edge detection (SFRED) technique may segment the identified surface cracks. Alternatively, a Mask region-based convolutional neural network (Mask-RCNN) may identify and segment surface cracks in parallel. Photogrammetry is used to generate a textured three-dimensional (3D) mesh model of the infrastructure from the 2D images. A texture cover of the 3D mesh model is analyzed to determine quantitative measures of identified surface cracks. The 3D mesh model is displayed to provide a visualization of identified surface cracks and facilitate inspection of the infrastructure.

In one embodiment, a set of 2D images of infrastructure are acquired using a handheld camera and/or a camera of an unmanned aerial vehicle (UAV). A deep learning process identifies and segments surface cracks in one or more of the 2D images of the set of 2D images to produce a set of segmented 2D images that are each divided into crack pixels and non-crack pixels. The deep learning process may employ a Faster-RCNN to identify surface cracks and generate bounding boxes that surround each surface cracks in the one or more 2D images and a SFRED technique to segment surface cracks and generate segmentation masks that indicate crack pixels and non-crack pixels inside each of the bounding boxes, or a Mask-RCNN to both identify and segment surface cracks, wherein the Mask-RCNN includes a mask branch for producing a segmentation mask in parallel with a recognition branch for generating a bounding box. Prior to use, training may be performed using transfer learning. Images of actual infrastructure captured during inspections and labeled with bounding boxes or mask images that identify cracks may be used in a fine-tuning stage of the training.

A photogrammetry process (e.g., a structure from motion (SFM) photogrammetry process) generates a textured 3D mesh model of the infrastructure from the segmented 2D images, which includes a polygon mesh and a texture cover that includes the identified surface cracks. An analysis process determines one or more quantitative measures (e.g., crack area, length or width) of identified surface cracks based on the texture cover. This may involve fusing the texture cover to produce a fused texture cover that depicts a surface of the infrastructure without any overlap, determining a conversion factor between a number of pixels in the fused texture cover and a distance in the infrastructure; and calculating the one or more quantitative measures based on the fused texture cover and the conversion factor. Indications of the one or more quantitative measures of identified surface cracks may be displayed in a user interface for use in analyzing the condition of the infrastructure. The textured 3D mesh model, which indicates the identified surface cracks, may also be displayed, or stored for later display, and use in inspection of the infrastructure.

It should be understood that a variety of additional features and alternative embodiments may be implemented other than those discussed in this Summary. This Summary is intended simply as a brief introduction to the reader for the further description which follows and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Definitions

As used herein the term "infrastructure" refers to a physical structure that has been built in the real world. Examples of infrastructure include bridges, buildings, dams, railways, highways, and the like.

As used herein the term "surface crack" refers to a crack that is manifest and is visible upon the surface of infrastructure. It should be understood that surface cracks can extend any amount below the surface into the internal structure of infrastructure.

Example Embodiments

Figure 1:
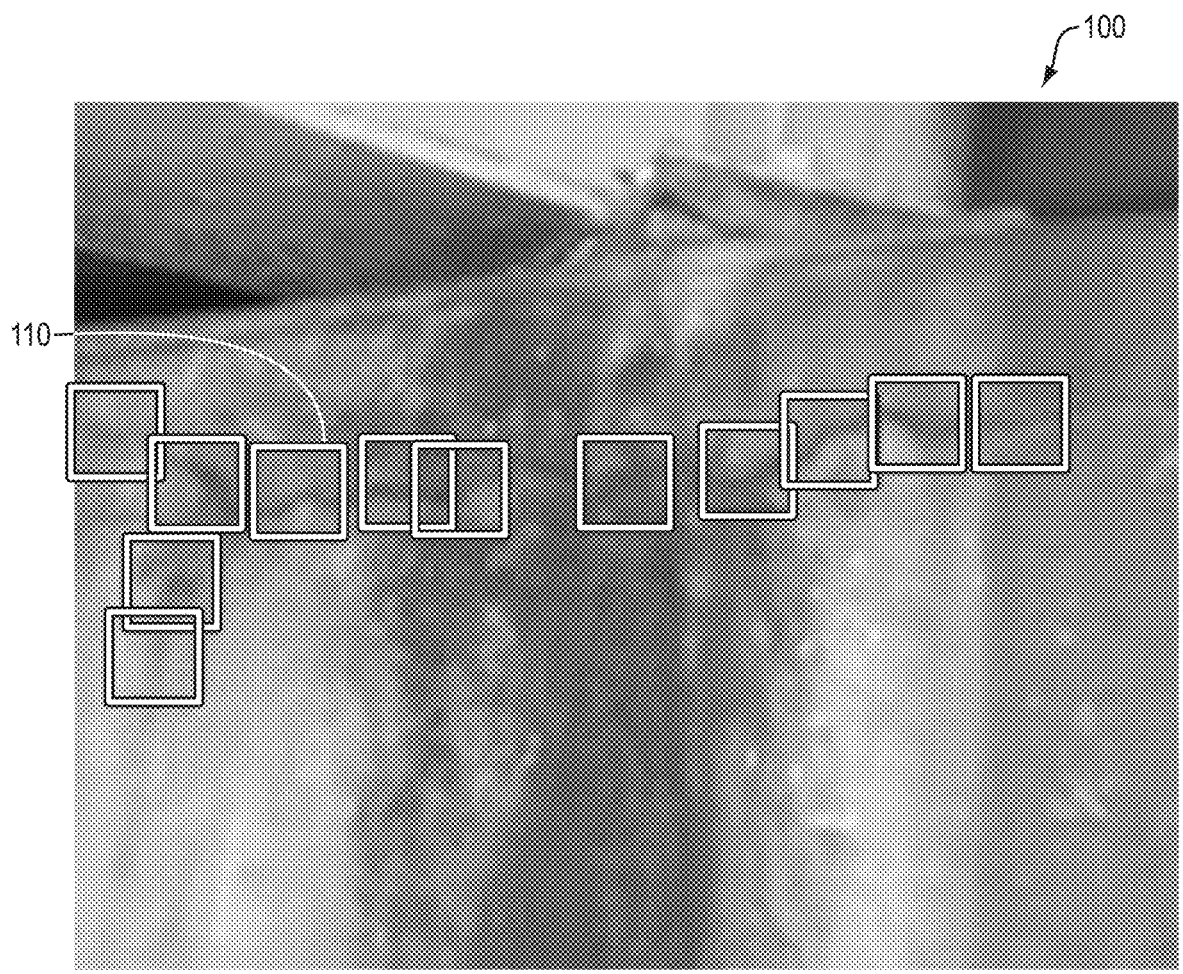
FIG. 1 is a 2D image that may be produced by an existing CNN-based crack-detection technique.
Figure 2:
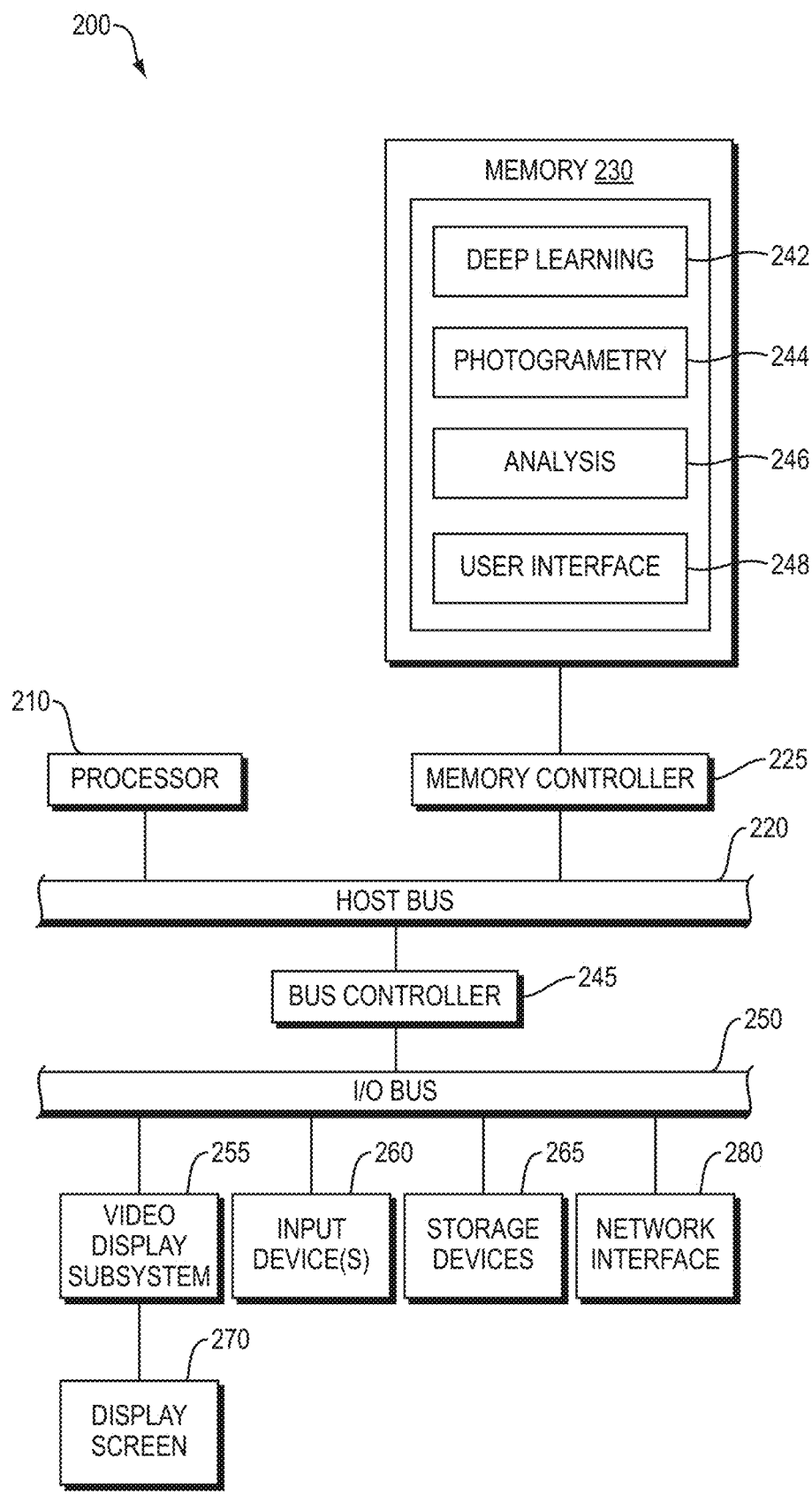
FIG. 2 is a block diagram of an example electronic device that may be used with the present deep learning and 3D mesh model-based techniques.

FIG. 2 is a block diagram of an example electronic device 200 that may be used with the present deep learning and 3D mesh model-based techniques. The electronic device 200 includes at least one processor 210 coupled to a host bus 220. The processor 210 may be any of a variety of commercially available processors. A volatile memory 230, such as a Random Access Memory (RAM) is also coupled to the host bus via a memory controller 225. When in operation, the memory 230 stores processor-executable instructions and data that are provided to the processor 210. An input/output (I/O) bus 250 is accessible to the host bust 220 via a bus controller 245. A variety of additional components are coupled to the I/O bus 250. For example, a video display subsystem 255 is coupled to the I/O bus 250. The video display subsystem 255 may include a display screen 270 and hardware to drive the display screen. At least one input device 260, such as a keyboard, a touch sensor, a touchpad, a mouse, etc., is also coupled to the I/O bus 250. A persistent storage device 265, such as a hard disk drive, a solid-state drive, or another type of persistent data store, is further attached, and may persistently store the processor-executable instructions and data, which are loaded into the volatile memory 230 when needed. Still further, a network interface 280 is coupled to the I/O bus 250. The network interface enables communication over a computer network, such as the Internet, between the electronic device 200 and other electronic devices, using any of a number of well-known networking protocols. Such communication may enable collaborative, distributed, or remote computing with functionality spread across multiple electronic devices.

Working together, the components of the electronic device 200 (and other electronic devices in the case of collaborative, distributed, or remote computing) execute instructions for a software package 240 that may be used to detect, assess and visualize surface cracks in infrastructure. The software package 240 may be a single software applications, or a collection of software applications that exchange data and otherwise interoperate.

The software package 240 includes a number of processes and modules, including a deep learning process 242, a photogrammetry process (e.g., a SFM photogrammetry process) 244, an analysis process 246 and a user interface process 248. The deep learning process 242 may implement a Faster-RCNN and a SFRED technique, or a Mask-RCNN, that operate to identify and segment surface cracks, as discussed in more detail below. The photogrammetry process 244 may perform SFM photogrammetry, or another type of photogrammetry, to generate a 3D mesh model, as discussed in more detail below. The analysis process 246 may determine quantitative measures of identified surface cracks, as discussed in more detail below. The user interface process 248 may display the determined quantitative measures for use in analysis and the 3D mesh model with indications of identified cracks for use in inspection, as discussed in more detail below.

Figure 3:
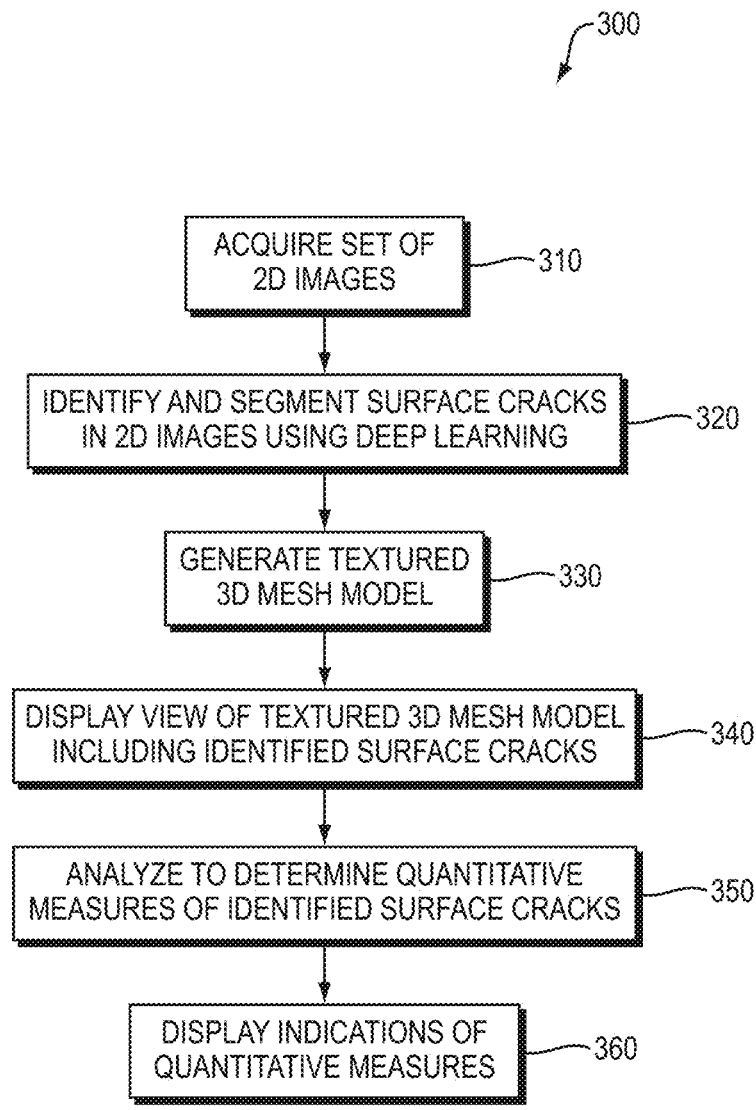
FIG. 3 is a flow diagram of an example sequence of steps that may be implemented to use a software package that performs the present deep learning and 3D mesh model-based techniques to detect, assess and visualize surface cracks in infrastructure.

FIG. 3 is a flow diagram of an example sequence of steps that may be implemented to use the software package 240 to detect, assess and visualize surface cracks in infrastructure. At step 310, a set of 2D images of infrastructure are acquired using a handheld camera and/or a camera of a UAV (e.g., for areas that are hard to reach) The set may include hundreds, or even thousands of individual 2D images each of which contain only a small part of the structure. The 2D images preferably overlap (e.g., by at least 50%) to better enable subsequent 3D mesh model generation using photogrammetry (e.g., SFM photogrammetry). Likewise, the 2D image preferable are of high resolution and captured with substantially the same distance between the camera and the surface of the infrastructure to improve subsequent crack identification.

At step 320, the deep learning process 242 identifies and segments surface cracks in one or more of the 2D images of the set of 2D images to produce a set of segmented 2D images that are each divided into crack pixels and non-crack pixels. Deep learning is built on the foundation of CNNs. Similar to as would be done with regular CNNs, in deep learning pixels from images are converted to feature representations through a series of mathematical operations. They typically go through several processing steps, commonly referred to as "layers". The outputs of the layers are referred to as a "feature map". By combining multiple layers it is possible to develop a complex nonlinear function that can map high-dimensional data (such as images) to useful outputs (such as classification labels). Commonly there are serval layer types, such as convolution layers, pooling layers and batch normalization layers. The first few convolution layers extract features like edges and textures. Convolution layers deeper in the network can extract features that span a great spatial area in an image, such as object shapes. Deep-learning differs from CNN in that it can learn the representations of data without introducing any hand-crafted rules or knowledge. This provides greater flexibility and effectiveness in a variety of use cases.

Figure 4:
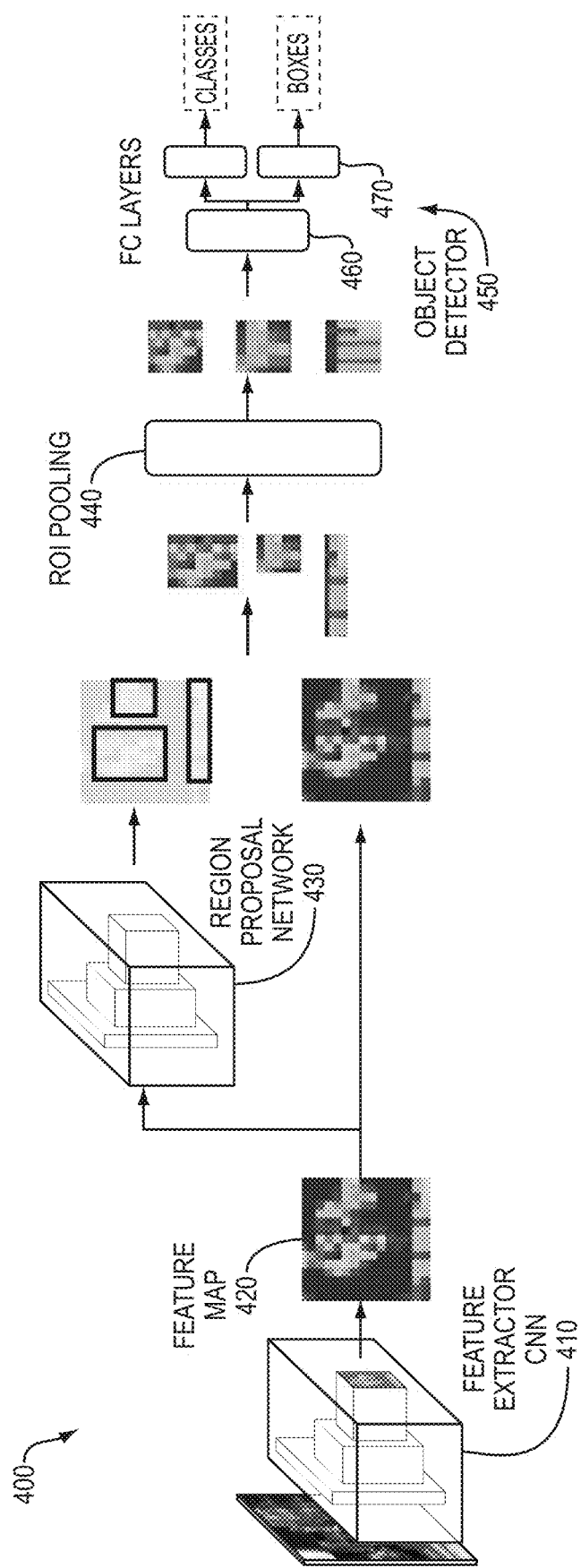
FIG. 4 is a diagram of an example Faster-RCNN architecture.

In one embodiment, the deep learning process 242 may employ a Faster-RCNN to identify surface cracks and generate bounding boxes that surround each surface cracks in the 2D images and a SFRED technique to segment surface cracks and generate segmentation masks that indicate crack pixels and non-crack pixels inside each of the bounding boxes. FIG. 4 is a diagram of an example Faster-RCNN architecture 400. The architecture assigns bounding boxes in a 2D image, and assigns labels to the bounding boxes indicating they surround surface cracks along with probabilities for each label. Initially, a feature extractor CNN 410 produces convolution feature maps 420 from a 2D image. These serve as inputs to a region proposal convolution network (RPN) 430. The RPN 430 is a fully convolutional network the efficiently generates proposal regions (candidates) on a wide range of scales (anchors). The region proposals are rectangular regions of interest (ROIs) that may or may not contain surface cracks. The RPN utilizes a sliding window on the feature maps 420. A ROI pooling layer 440 then maps the window to lower-dimensional features. The newly created lower-dimensional features are fed to a recognition branch that includes an object detector 450. The object detector 450 may include fully connected layers for box regression 460 and box classification 470. The Faster-RCNN may be run through once for the entire input image and then again to refine the proposal regions.

Figure 5:
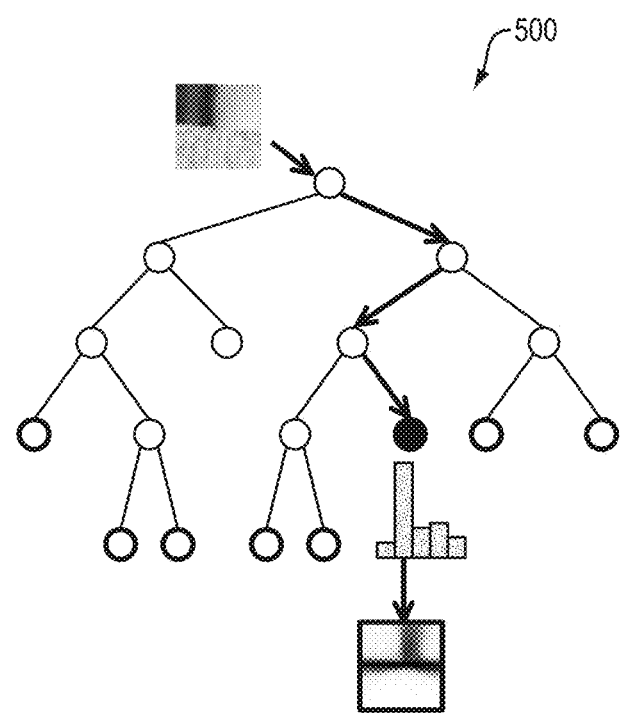
FIG. 5 is a diagram showing a routing path through an example structured random forest decision tree that may be used in a SFRED technique.

In an embodiment that uses Faster-RCNN to identify bounding boxes surrounding surface cracks, a SFRED technique may be used to segment surface cracks inside each of the bounding boxes. SFRED uses tokens (segmentation masks) to indicate crack regions in an image. FIG. 5 is a diagram 500 showing a routing path through an example structured random forest decision tree that may be used in a SFRED technique. Image patches are clustered using the structured random forest. An image patch may be selected from within a bounding box by a sliding window (e.g., of 16×16 pixels). The structured random forest classifies an image patch by recursively branching left or right down the tree until a leaf is reached. The leaf stores the prediction of the image patch. Such leaves are associated with tokens (e.g., segmentation masks) that have similar structure. To ensure connectivity of detected surface cracks, erosion and dilation operations may be applied to the results. These operations help reduce noise that may be present in images. Detected small fragments of cracks may be merged together and continuity improved.

Figure 6:
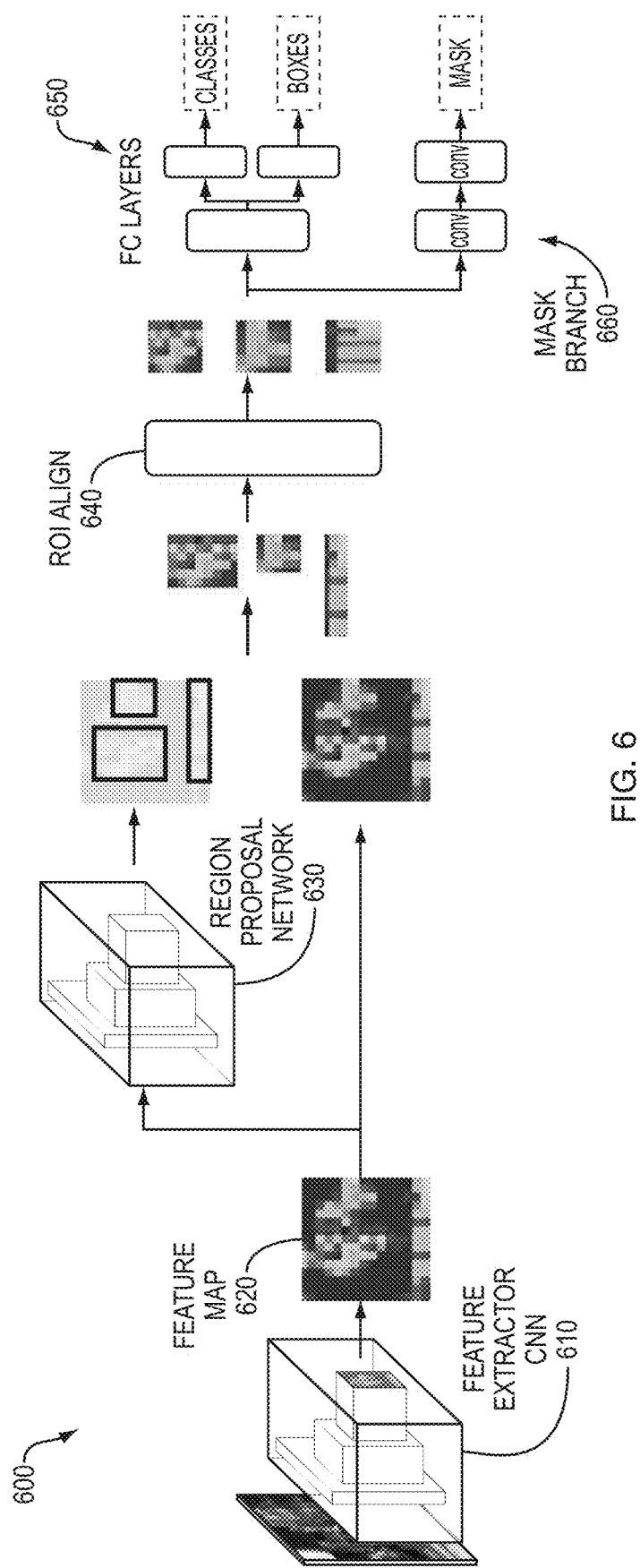
FIG. 6 is a diagram of an example Mask-RCNN architecture.

In another embodiment, the deep learning process 242 may employ a Mask-RCNN to both identify and segment surface cracks, wherein the Mask-RCNN includes a mask branch for producing a segmentation mask in parallel with a recognition branch for generating a bounding box. FIG. 6 is a diagram of an example Mask-RCNN architecture 600. Similar to a Faster-RCNN architecture, the Mask-RCNN architecture 600 uses a feature extractor CNN 610, feature maps 620, a RPN 630, and a recognition branch including an object detector 650. However, the Mask-RCNN architecture 600 also includes an additional mask branch 660 that segments surface cracks in parallel to the recognition branch. The mask branch includes full convolution layers that take regions with a crack and generates pixel-wise segmentation masks. In order to produce more precise pixel-wise segmentation masks, the typical ROI pooling layer used in a Faster-RCNN architecture may also be replaced by a ROI aligning layer 640 that uses bilinear interpolation in extracting the feature map.

Any of a number of commercially available convolutional neural networks may be used to implement the Faster-RCNN or Mask-RCNN. In one embodiment an Inception-ResNet-V2 Convolutional neural network is employed. In alternative embodiments, Resnet-50, ResNEt-101, Inception-V2, or another commercially available Convolutional neural network may be employed.

Figure 7:
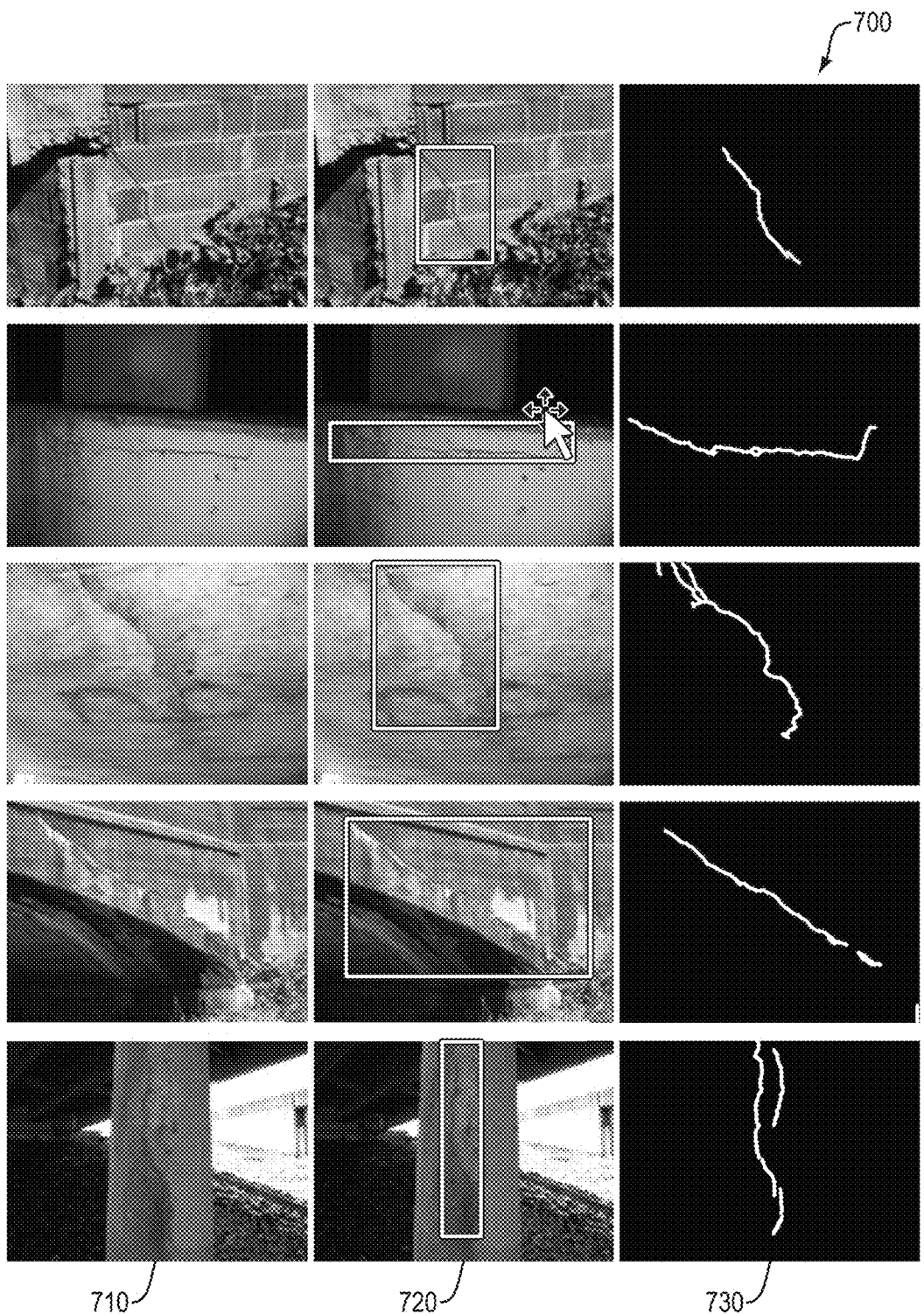
FIG. 7 is a series of example images of a crack detection dataset.

It should be noted that prior to execution of step 320, the deep learning process must be trained (not shown in FIG. 3). Convolutional neural networks with many layers usually contain millions of trainable parameters. Directly training such a huge number of parameters is problematic, given that training datasets are usually small. Transfer learning may be used to address this issue. In transfer learning, one network is first pretrained on a base dataset and task and then the learned features (base model) are repurposed (transferred) to a second network that is fined tuned with a second network (with the same architecture) that is fine-tuned on a smaller target dataset and task (here a crack detection dataset and task) to produce a final model. Faster-RCNN and Mask-RCNN may be pretrained using a commercially available dataset, such as the MS-COCO dataset. FIG. 7 is a series of example images 700 of a crack detection dataset. To fine-tune Faster-RCNN, a crack detection dataset may be created that includes 2D images of real-world infrastructure 710 and tight fitting ground truth bounding boxes surrounding cracks 720. To fine-tune Mask-RCNN, a crack detection dataset may be created that includes 2D images of real-world infrastructure 710 and ground truth mask images that show crack pixels 730.

Figure 8:
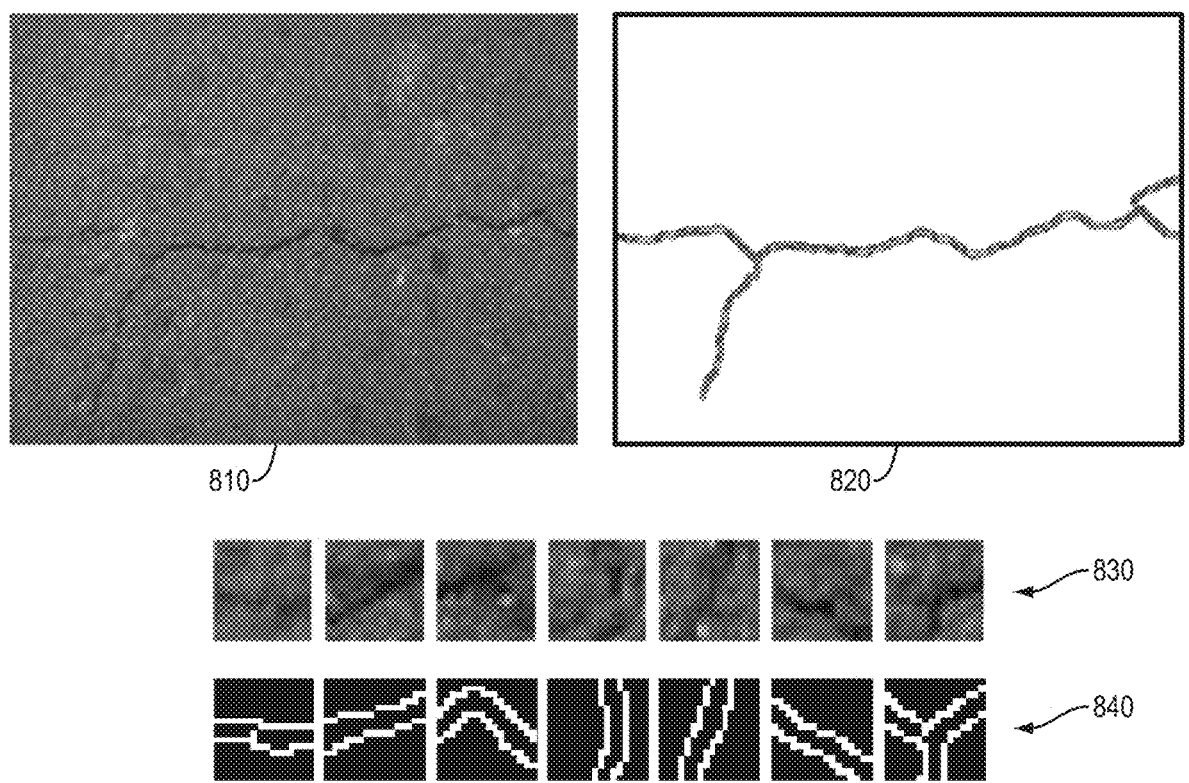
FIG. 8 is an example original image of real-world infrastructure of a crack detection dataset, ground truth showing a surface crack therein, and extracted image patches and tokens.

To train SFRED, extracted image patches and tokens from a crack detection dataset may be clustered using a structured random forest. FIG. 8 is an original image of real-world infrastructure 810 of a crack detection dataset, ground truth 820 showing a surface crack therein, and extracted image patches 830 and tokens 840. A sliding window (e.g., of 16×16 pixels) may be used to extract image patches 840 from the original image 810. An image patch containing a labeled crack edge at is center pixel is regarded as a positive instance. Once extracted, to describe an image token, the features (such as mean and standard deviation) are calculated on these patches. These may be computed on gray level images and applied to describe brightness and gradient information. A set of channel features composed with color, gradient and orientation gradient may also be applied. The image patches and tokens are applied to the structured random forest, and as a result tokens with the same structure are gathered at the same leaves.

Returning to FIG. 3, at step 330 the photogrammetry process 244 generates (and stores) a textured three-dimensional (3D) mesh model of the infrastructure from the segmented 2D images. The 3D mesh model may include a polygon mesh and a texture cover that includes the identified surface cracks. In general, photogrammetry techniques operate by extracting geometric information from 2D images. By combining lots of 2D images, a 3D model can be generated. Shared points are registered among the 2D images and then distances in 3D space are calculated. The result is a point cloud that can be transformed into a 3D mesh model. Texture information from the 2D images may be extracted and draped on the 3D mesh model, forming a texture cover. For many photogrammetry techniques to operate properly, a minimum of 50% overlap among the 2D images is required.

One specific type of photogrammetry that may be employed by the photogrammetry process 244 is SFM photogrammetry. SFM may be implemented using a number of stages, including reconstruction, texturing and annotation, and retouching. Reconstruction may involve draft reconstruction, refinement, and simplification that produce faces of the 3D mesh model. Texturing and annotation may construct the textures to be shown on the faces and generate representations for non-visual data to be added. Retouching may involve editing to geometry and textures to correct artifacts and other issues.

Figure 9A:
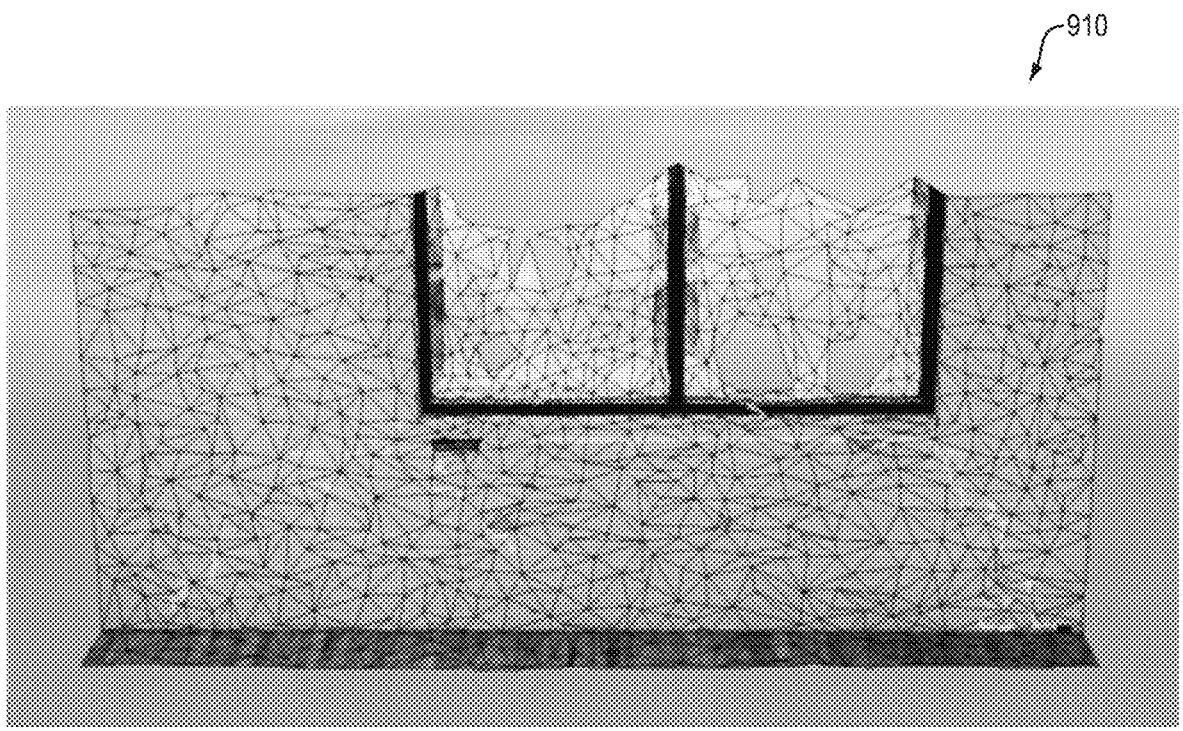
FIG. 9A is an example 3D mesh model that may be generated as part of FIG. 3.

FIG. 9A is an example 3D mesh model 910 that may be generated as part of step 330 of FIG. 3. Here the 3D mesh model shows a brick interior wall of a building about a window.

At step 340, the user interface process 248 displays a view of the textured 3D mesh model in a user interface on a display screen 270. Such step may occur immediately after the textured 3D mesh model was generated, or the textured 3D mesh model may be stored and step 340 performed at some later date. Identified surface cracks may be emphasized in the view using a contrasting color, texture, or other visual indicator. The user may navigate about the 3D mesh model, changing viewpoint to update the view to show different portions of the infrastructure. The view may allow an inspector to intuitively visualize and systematically access cracks within the context of the structure as a whole, as opposed to individual 2D images which typically only cover a small part of the structure from a predetermined viewpoint.

Figure 9B:
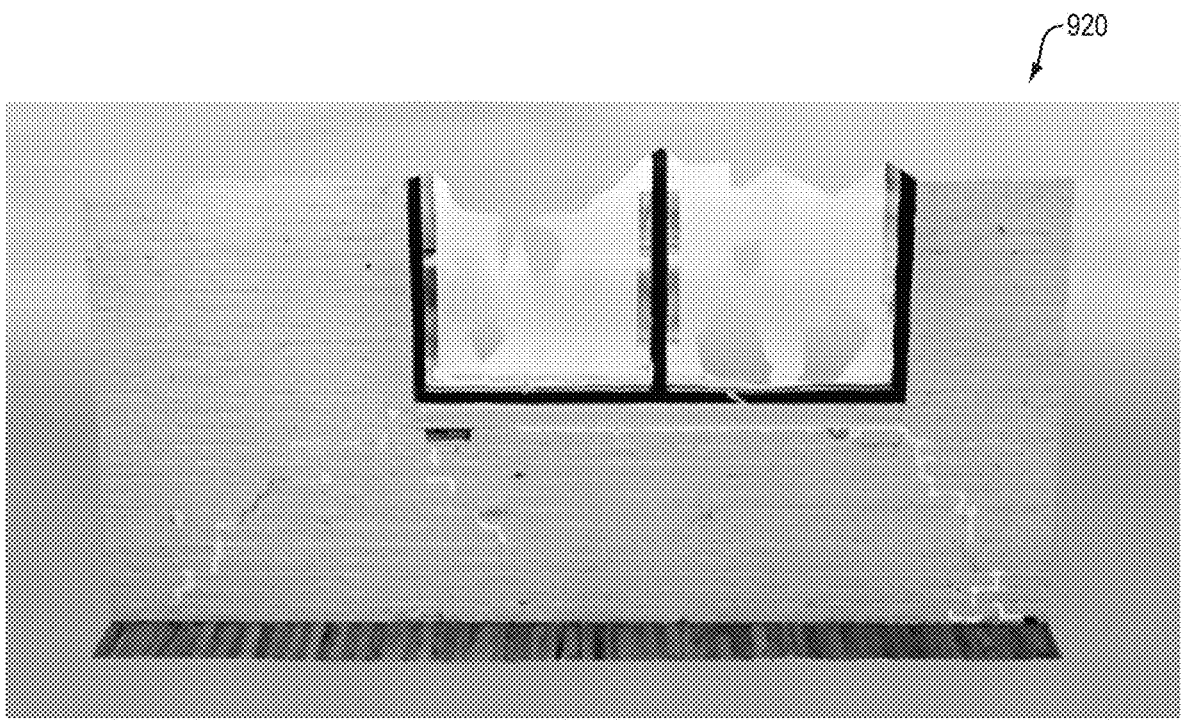
FIG. 9B is a view of an example textured 3D mesh model based on the example 3D mesh model of FIG. 9A that provides visualization of cracks.

FIG. 9B is a view of an example textured 3D mesh model 920 based on the example 3D mesh model of FIG. 9A that provides visualization of cracks.

Figure 9C:
FIG. 9C is an example fused texture cover produced from the example textured 3D mesh model of FIG. 9A.

At step 350, the analysis process 246 uses the texture cover of the textured 3D mesh model to determine quantitative measures of identified surface cracks, such as crack area, length or width. Because the 2D images overlap, identified surface cracks in the 2D images often will overlap, and thereby it is difficult to accurately quantifying cracks directly from the 2D images. As part of step 350, the analysis process 246 produces a fused texture cover that depicts a surface of the infrastructure without any overlap. FIG. 9C is an example fused texture cover 930 produced from the example textured 3D mesh model of FIG. 9A.

Using the fused texture cover, crack area in pixels may be calculated by counting the number of crack pixels. Crack length in pixels may be calculated by applying a thinning algorithm iteratively until the cracks only show one pixel widths. Average crack width in pixels may be calculated by dividing the crack area with crack length. Likewise, other quantitative measures may be similarly calculated in pixels. Such measures in pixels may then be converted to distance in the infrastructure by applying a conversion factor that converts a number of pixels in the fused texture cover to a distance in the infrastructure. The conversion factor may be based on a relation between a field measurement of an element of the infrastructure and a number of pixels that depict that element. Quantitative measures of identified surface cracks may be used to classify cracks into different categories or levels, and crack statistics may be summarized for assessing structural condition.

Figure 9D:
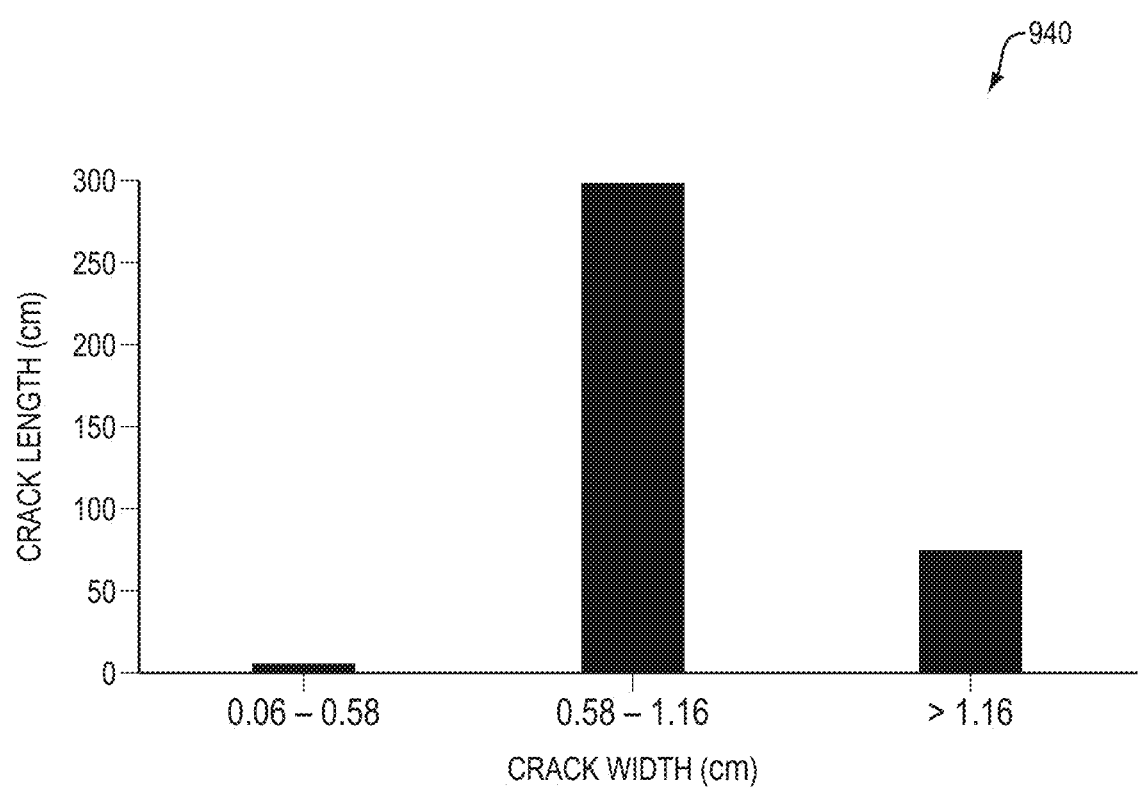
FIG. 9D is an example display of summarized crack statistics produced from the example fused texture cover of FIG. 9C.

At step 360, the user interface process 248 displays indications of quantitative measures (e.g., summarized crack statistics) for identified surface cracks. FIG. 9D is an example display of summarized crack statistics 940 produced from the example fused texture cover of FIG. 9C.

In conclusion, the above-described techniques provide for crack detection, assessment and visualization for infrastructure utilizing deep learning in combination with a 3D mesh model. It should be understood that various adaptations and modifications may be made to the techniques to suit various applications and environments. While a software-based implementation is discussed above, it should be understood that the technique, at least in part, may be implemented in hardware. In general, a variety of software-based implementations, hardware-based implementations, and combinations thereof are contemplated. A software-based implementation may include electronic device-executable instructions stored in a non-transitory electronic device-readable medium, such as a volatile or persistent memory, a hard-disk, a compact disk (CD), or other storage medium. A hardware-based implementation may include specially configured processors, logic circuits, application specific integrated circuits, and/or other types of hardware components. Further, a combined implementation may include both electronic device-executable instructions stored in a non-transitory electronic device-readable medium, as well as one or more hardware components.

In general, it should be understood that the above descriptions are meant to be taken only by way of example and are not intended to limit the scope of the invention.

What is claimed is:

1. A method comprising:
   acquiring a set of two-dimensional (2D) images of infrastructure;
   identifying surface cracks in the 2D images and segmenting the identified surface cracks in the 2D images, by a trained Mask Region-Based Convolutional Neural Network (Mask-RCNN) executing on one or more electronic devices, to produce segmented 2D images having pixels that are divided into crack pixels that are part of identified surface cracks, and non-crack pixels that are not part of the identified surface cracks;
   extracting, by a photogrammetry process executing on the one or more electronic devices, geometry information from the segmented 2D images produced by the Mask-RCNN and generating a three-dimensional (3D) mesh model of the infrastructure from the geometry information;
   extracting, by the photogrammetry process, textures from the segmented 2D images produced by the Mask-RCNN and draping the textures on the 3D mesh model as a texture cover to form a textured 3D mesh model of the infrastructure;
   indicating the identified surface cracks in the textured 3D mesh model by showing the crack pixels in the texture cover of the textured 3D mesh model with a contrasting color;
   displaying, in a user interface on a display screen of the one or more electronic devices, the textured 3D mesh model to provide a visualization of identified surface cracks;
   determining, by an analysis process executing on the one or more electronic devices, one or more quantitative measures of identified surface cracks in pixels based on the texture cover of the textured 3D mesh model;
   determining a conversion factor between a number of pixels in the texture cover of the textured 3D mesh model and a distance in the infrastructure;
   converting the one or more quantitative measures of identified surface cracks in pixels to one or more quantitative measures for the infrastructure by applying the conversion factor; and
   displaying, in a user interface on a display screen, an indication of the one or more quantitative measures of identified surface cracks for the infrastructure.

2. The method of claim 1, wherein the determining one or more quantitative measures further comprises:
   fusing the texture cover to produce a fused texture cover that depicts a surface of the infrastructure without any overlap.

3. The method of claim 1, wherein the one or more quantitative measures include at least one of crack area, length or width.

4. The method of claim 1, wherein the set of 2D images is acquired using a handheld camera and/or a camera of an unmanned aerial vehicle (UAV), and the photogrammetry process is a structure from motion (SFM) photogrammetry process.

5. The method of claim 1, further comprising:
   training a Mask-RCNN using transfer learning which pretrains a network with a base dataset and task and then transfers learned features to a second network that is fine-tuned with a crack image dataset to produce the trained Mask-RCNN.

6. The method of claim 5, wherein the crack image dataset includes a plurality of 2D images of infrastructure captured during inspections and labeled with identified cracks.

7. A non-transitory electronic device-readable medium having executable instructions stored thereon, the instructions when executed by one or more processors being operable to:
   acquire a set of two-dimensional (2D) images of infrastructure from a handheld camera and/or a camera of an unmanned aerial vehicle (UAV);
   identify surface cracks in the 2D images and segment the identified surface cracks in the 2D images, using a trained Mask Region-Based Convolutional Neural Network (Mask-RCNN), to produce segmented 2D images having pixels that are divided into crack pixels that are part of identified surface cracks, and non-crack pixels that are not part of the identified surface cracks;
   extract geometry information from the segmented 2D images produced by the Mask-RCNN and generate a three-dimensional (3D) mesh model of the infrastructure from the geometry information;
   extract textures from the segmented 2D images produced by the Mask-RCNN and drape the textures on the 3D mesh model as a texture cover to form a textured 3D mesh model of the infrastructure;
   indicate the identified surface cracks in the textured 3D mesh model by showing the crack pixels in the texture cover of the textured 3D mesh model with a contrasting color;
   store the textured 3D mesh model;
   determine one or more quantitative measures of identified surface cracks in pixels based on the texture cover of the textured 3D mesh model;
   determine a conversion factor between a number of pixels in the texture cover of the textured 3D mesh model and a distance in the infrastructure;
   convert the one or more quantitative measures of identified surface cracks in pixels to one or more quantitative measures for the infrastructure by applying the conversion factor; and
   store an indication of the one or more quantitative measures of identified surface cracks for the infrastructure.

8. The non-transitory electronic device-readable medium of claim 7, wherein the instructions to determine one or more quantitative measures include instructions that when executed are operable to fuse the texture cover to produce a fused texture cover that depicts a surface of the infrastructure without any overlap.

9. The non-transitory electronic device-readable medium of claim 7, wherein the instructions when executed are further operable to:
   train a deep learning process using transfer learning which pretrains a network with a base dataset and task and then transfers learned features to a second network that is fine-tuned with a crack image dataset to produce a final model, wherein the crack image dataset includes a plurality of 2D images of infrastructure captured during inspections that are labeled with identified cracks.

\* \* \* \* \*